Feb. 13, 1940.                S. PACILIO                 2,190,483
                    MACHINE FOR MAKING ITALIAN PIZZA
                        Filed Feb. 27, 1939        3 Sheets-Sheet 1
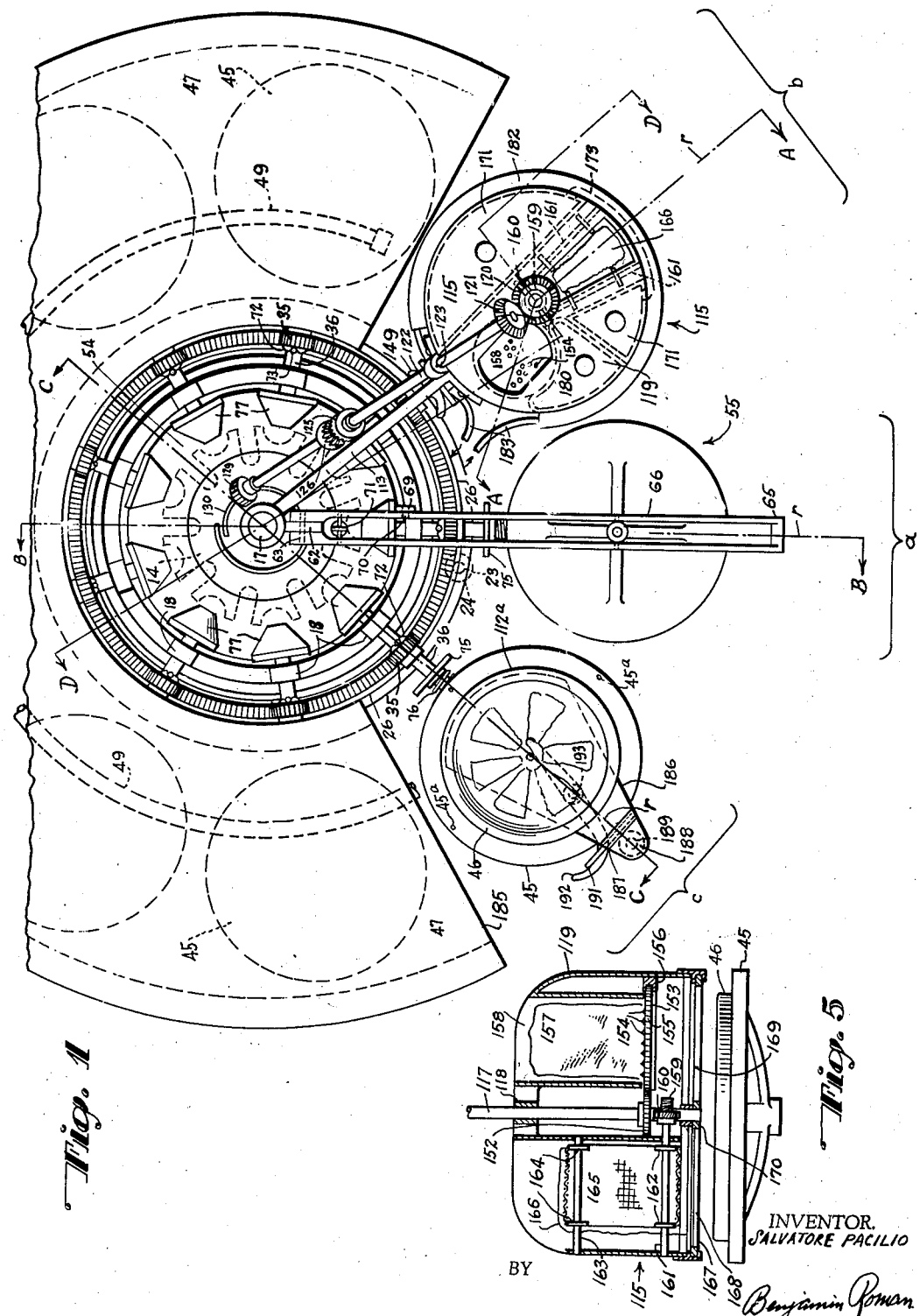
INVENTOR.
SALVATORE PACILIO
BY
Benjamin Roman
ATTORNEY.

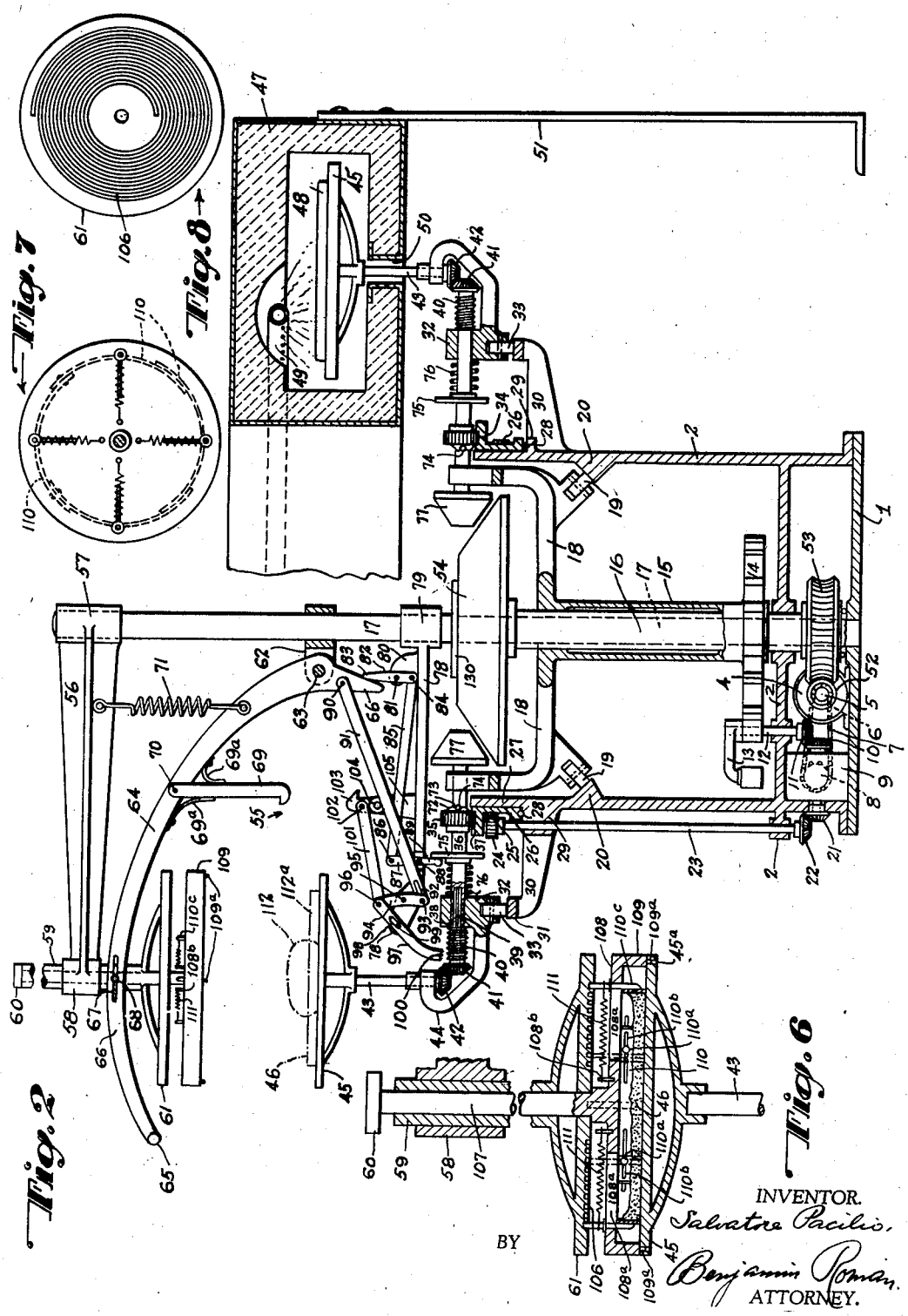

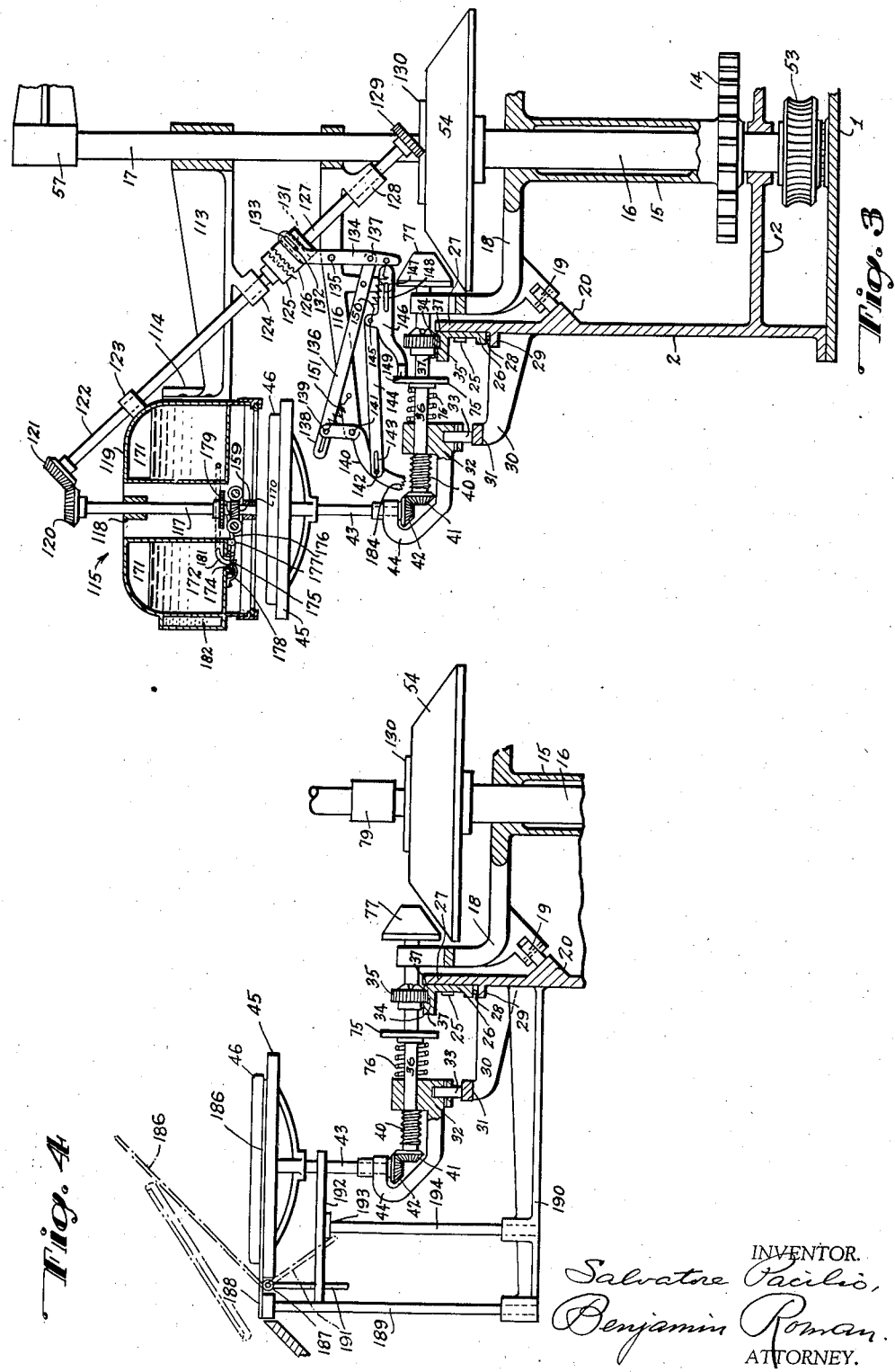

Patented Feb. 13, 1940

2,190,483

UNITED STATES PATENT OFFICE 2,190,483

MACHINE FOR MAKING ITALIAN PIZZA

Salvatore Pacilio, New York, N. Y.

Application February 27, 1939, Serial No. 258,739

20 Claims. (Cl. 107—1)

This invention relates to an automatic machine for the making and production of Italian "pizza", a baked cake-like food consisting of a body of dough which is covered over and impregnated with cheeses, tomato, and oil. Heretofore, these pizzas were made wholly by hand, requiring centrifugal gyration of the prepared dough to form the proper cake, and the separate covering of the latter with layers of the above seasonings, which operations consumed much skillful labor, time, and expense. Further difficulties in the production of this food arise from the requirements of inserting the pizza into the oven right after its preparation, of only a brief period permitted for the baking, of its service for sale and consumption in warm fresh condition, and that the demands therefor occur very heavily during limited meal hours. Due to the above mentioned and other well known circumstances, the exploitation of this article is rendered inherently limited and the development of its industry is thwarted.

The principal object of the invention, therefore, is to remedy the above disadvantages, and to provide a machine which will automatically and efficiently produce the Italian pizzas.

Other objects and advantages will hereinafter appear.

In the accompanying drawings—

Fig. 1 is a plan view of the Italian pizza making machine constituting the invention, the machine being shown as partially broken away for clearness of illustration.

Fig. 2 is a cross-sectional elevation of the machine shown in Fig. 1, taken on the line B—B of Fig. 1, and illustrating the loading mechanism of the machine.

Fig. 3 is a similar type view, taken on the line D—D of Fig. 1.

Fig. 4 is a fragmentary similar type view, partly in full and partly cross-sectional, taken on the line C—C of Fig. 1.

Fig. 5 is a transverse-sectional view, in an enlarged scale, taken on the line A—A of Fig. 1, and showing the seasoning device and mechanism of the machine.

Figs. 6, 7, 8 are respectively a cross-sectional elevation, a top plan view, and a bottom plan view, all showing details of operating parts of the machine.

Upon the base 1 of the machine, Fig. 2, is erected a framing 2, as shown, and upon said base is mounted an electric motor 4 to the drive shaft 5 of which is keyed a sprocket-wheel 6 meshing with a chain 7, which in turn meshes with a wheel 8 that operates a speed reduction box 9. Said box drives a gear 10 meshing with a gear 11 keyed upon a shaft 12 running in framing 2, which shaft carries an operating pawl 13 for a Geneva wheel 14 secured to a sleeved shaft 15 rotatably mounted upon a sleeved shaft 16 journaled upon a stationary vertical shaft 17 projecting upwardly as shown from the base 1. The rotatable shaft 15 carries a series of arms 18 equipped with trolleys 19 running upon a circular track 20 forming part of the framing 2, for the efficient support and operation of the arms 18 and the mechanism depending therefrom, as will be hereinafter seen.

The reduction box 9 drives a gear 21 meshing with a gear 22 keyed upon a shaft 23 journaled in the framing 2, the opposite end of which shaft carries a gear 24 that meshes with a large gear 25 formed upon a ring 26. Said ring is concentric with the shaft 17 and constitutes a sleeve which is journaled about a bearing portion 27 of the framing 2 and rides upon a ball bearing 28 provided in a shelf 29 forming part of said framing, as shown. From the shelf 29 project brackets 30 that carry a circular track 31 which is concentric with the shaft 17, and a registering ring 32 is equipped with trolleys 33 that ride upon the said track for its support.

The driven ring 26 is provided with a gear 34 that meshes with a pinion 35 slidably keyed upon a shaft 36 rotatably mounted in one of the arms 18 and in the ring 32, as illustrated, and maintained against lateral displacement by shoulders 37 forming part of the ring 26. Feathered within the end 38 of the shaft 36 is a shaft 39 on which is keyed a worm 40 and a gear 41 that meshes with a gear 42 keyed upon a shaft 43 journaled in an arm 44 depending from the ring 32, which arm carries a tray 45 intended to maintain a pizza 46 constituting the product of the machine.

As viewed in Fig. 1, there are nine of the arms 18 and of the mechanism depending therefrom, including the driven shafts 36, upright shafts 43, and trays 45, which arms project as spokes from the sleeved shaft 15 that is continually operated rotatably by the Geneva motion 13, 14. The operation of said motion is such that for each revolution of the wheel 14 the shaft 15 and its dependent nine mechanism including the trays 45 perform nine fractional revolutions with nine intervening rest periods, while at the same time the trays 45 are continually rotated by the driven ring 26 and gears 35, 41, 42.

In the segmental regions $a$, $b$, $c$ about the trays 45 there are located devices and mechanism for performing certain vital functions in connection with the making of the pizzas, as will be hereinafter seen, and over the remaining seven regions there is located an oven 47, as illustrated in Figs. 1, 2. Said oven is arcuate about the central shaft 17 and comprises a baking chamber 48, a gas flame supplying burner 49, a gap 50 for transit of the shafts 43 therethrough, and posts 51 for supporting the oven, the chamber 48 thereby accommodating the trays 45. Thus, three of the trays 45 are at all times situated in the regions a, b, c, performing resting intervals when registering with the radial lines r of the regions and segmental revolutionary movements between the said lines, while the remaining six trays are accommodated within the oven 47.

The motor shaft 5 carries a worm 52 meshing with a wheel 53 keyed upon shaft 16 which carries at its upper end a friction cone pulley 54, which is thus continually driven and the function of which will be hereinafter described.

Over the radial line r in region a, Fig. 1, is located a pizza loading and preparing device and mechanism 55, Fig. 2, which includes a bracket 56 registering with said line and secured by a hub 57 to the stationary shaft 17, and the terminal of said bracket is provided with a hub 58 in which is vertically splined a tube 59 carrying a stop flange 60 at the upper extremity thereof and a plate 61 at its lower end. To an ear-piece 62 secured to shaft 17 as shown is fulcrumed at 63 an arcuate lever 64 having a handle 65 at the extremity thereof, an arm 66, a slot 67 through which protrudes a pin 68 projecting from the tube 59, and a pawl 69 which is maintained in suspension therefrom by a pivot 70, the lever 64 being normally maintained in the elevated state illustrated by a spring 71 secured thereto and to the bracket 56 as shown.

The gear 35 is mounted rotatably about the shaft 36 and provided with a clutching member 72 having a cammed notch 73 in which normally lodges a pin 74 projecting from said shaft, by which means the rotation of the gear 35 is normally transmitted to the shaft 36, which can be slid through said gear in a direction toward the pulley 54. Said shaft carries a flange 75, between which and the revolvable ring 32 is located a spring 76 curled about the shaft 36 and secured to both said flange and the ring, said spring normally drawing the flange toward the ring and thereby maintaining the pin 74 interlocked with the member 72 and clutching the shaft 36 to the gear 35. The terminal of shaft 36 carries a cone friction pulley 77, which is cooperative with the pulley 54 but normally out of contact therewith, as shown, and said shaft is slidable toward and away from the pulley 54 through its bearings in the arm 18 and ring 32, impeded in the latter direction by its clutching with the gear 35.

The shaft 17 carries a bracket 78 secured thereto by a hub 79 and provided with a projection 80 to which is fulcrumed at 81 a lever 82, one end 83 of which contacts with the arm 66. To the opposite extremity of lever 82 is pivoted at 84 a link 85, which is in turn pivoted at 86 to a lever 87 fulcrumed at 88 to the bracket 78, an arm 89 of the lever contacting with the flange 75. To the arm 66 is pivoted at 90 a link 91 having in its extremity a slot 92, through which protrudes the pivoting pin 93 of a lever 94 fulcrumed at 95 to the bracket 78 and in turn pivoted at 96 to a pawl 97. Said pawl is provided with a slot 98, through which protrudes a pivoting pin 99 projecting from the bracket 78, and its terminal 100 is toothed and formed to mesh with the worm 40, though normally maintained out of contact therewith, as illustrated. The lever 94 is also pivoted at 96 to a link 101 which is in turn pivoted at 102 to a hook 103, hinged at 104 to a post 105 projecting from the bracket 78.

In the underside of plate 61 is formed a spiral groove 106 constituting a cam, Figs. 6, 8, and in the tube 59 is rotatably mounted a shaft 107, of which flange 60 forms a part, which shaft carries an inverted tray 108 having a rim 109. Upon the underside of tray 108 are located springy bands 110 which are interlinked with each other as shown, by means of headed pins 110a of one passing through slots 110b of another, whereby these interlinked bands may be contracted to form a narrow collar shown by the dash and dot lines in Fig. 6 and expanded into a large collar, Figs. 6, 7. To each band 110 is secured a pin 110c which protrudes through a radial slot 108a in tray 108, which pin is normally drawn toward the shaft 107 by a spring 111 joined thereto and to a pin 108b secured to tray 108. The pins 110c have their terminals projecting into the groove 106, whereby rapid rotation of the tray 108 causes the cam action of said groove to draw said pins and the bands 110 away from shaft 107 and expand said bands to the position shown, while arresting rotation of tray 108 draws said bands to the position of the dash and dot lines by tension of springs 111. The rim 109 is provided with pins 109a which engage holes 45a formed in the tray 45, when said rim contacts with said tray, due to the rotation of the latter.

When the intermittent revolutionary travel of the tray 45 brings its center into registry with the radial line r of region a, Fig. 1, the pawl 61 is directly over the hook 103, and just prior thereto the operative places a batch 112 of prepared pizza dough upon said tray, as indicated in Fig. 2. Thereupon he swings the lever 64 downwardly by its handle 65, which causes the pawl 69 to engage the hook 103 and thereby lock the lever in the actuated position. The lever-arm 66 actuates the lever 82, which through link 85 causes the lever 87 to shift the flange 75 and shaft 36, contrary to tension of spring 76, unclutches said shaft from gear 35, and contacts the friction pulley 77 with the driving pulley 54. This imparts a rapid rotation to pulley 77 and shaft 36, which rotation is transmitted to the tray 45, through gears 41, 42 and shaft 43. As during the interval of this operation the tray 45 is in its resting period, the aforesaid descent and interlocking of the lever 64 brings the rim 109 of inverted tray 108 close to the surface of the tray 45 and thereby causes the pins 109a of the former to interengage with the holes 45a of the latter, and the contracted bands 110 to encompass the dough batch 112. The rapid subsequent above described rotation of the tray 45 acts centrifugally upon the dough 112 and causes it to flatten, while simultaneously the said interengagement similarly rotates the tray 108 and pins 110c, which being actuated by the stationary cam 106 expand the interlinked bands 110 to their enlarged diameter. In this manner the dough 112 becomes reduced to a requisite form, diameter, and thickness, indicated by the dash and dot lines 112a, the above described action and operation of the bands 110 permitting this requisite forming of the dough 112 by centrifugal force, while operating to properly centre it upon the tray 45 and prevent lateral deviation thereof.

Simultaneously, the actuated lever-arm 66 draws the link 91 to swing the lever 94 and throw the pawl 97 to enmesh its terminal 100 with the worm 40 which causes said terminal to advance rightwardly, as viewed in Fig. 2, and swing the lever 94 to draw the link 101 and actuate the hook 103 out of engagement with the pawl 69. Leaf springs 69a secured to lever 64 and bearing upon the pawl, as shown, normally maintain the pawl 69 in operative condition for locking with and unlocking from the hook 103. This unhooking operation at once restores the mechanism and its parts to the positions illustrated in Fig. 2, the spring 71 elevating the lever 64 and its dependent parts, and the spring 76 causing the pulley 77 to leave the pulley 54, the shaft 36 to reclutch with the gear 35, and the flange 75 to restore the lever 87 with its dependent parts to inoperative condition, the lever-arm 66 meanwhile actuating its dependent parts to unmesh the pawl terminal 100 from the worm 40. This operation occurs just prior to the termination of the aforesaid resting period of the tray 45, and restores the tray to its normal rotary condition, whereupon its intermittent revolutionary cycle continues, with the pizza dough resting thereon in its properly prepared state and condition 112a.

Directly over the centre line r of the region b is located a bracket 113, secured to the stationary shaft 17, and having secured to its terminal 114, as shown, a seasoning device and mechanism 115, Figs. 1, 3, and below said bracket is located a bracket 116 secured to the same shaft. The mechanism 115 is operated by a vertical shaft 117 rotatably mounted in a bearing 118 forming part of a housing 119 of the device. Said shaft carries a gear 120 that meshes with a gear 121 keyed upon an oblique shaft 122 rotatably mounted in a bearing 123 fixed to housing 119 and a bearing 124 forming part of the bracket 113, and the terminal of the shaft 122 carries a clutch member 125. A cooperating clutch member 126 is splined upon a shaft 127 rotatable in a bearing 128, forming part of bracket 116, and carrying a gear 129 that meshes with a cam tooth 130 forming part of the rapidly rotating cone pulley 54. The clutch member 126 is rotatable in a collar 131 from which a pin 132 protrudes through a slot 133 of a lever 134 fulcrumed at 135 to the bracket 116, and a link 136 pivoted at 137 to said lever is provided with a slot 138 through which protrudes a pin 139 of a pawl 140 pivoted at 141 to the terminal of the bracket 116. A pin 142 of said pawl protrudes through a slot 143 of a link 144 which is in turn pivoted at 145 to a plate 146 that is slidably mounted upon the bracket 116 in the manner shown, by means of a projection 147 of the bracket passing through a slot 148 of the plate, and the latter is provided with a cam 149 configurated as indicated in Fig. 1. A spring 150 joined to pivot 145 and lever 134 holds the latter in contact with the plate 146 as shown, and a spring 151 joined to the pin 139 and bracket 116 maintains the pawl 140 in the position illustrated.

The operating shaft 117 of the seasoning device and mechanism 115, Figs. 1, 3, 5, carries a gear 152 that meshes with a gear 153 provided over its area with a series of grater teeth 154 and intervening openings 155, the gear 153 being rotatably mounted in a framing 156 of housing 119 as shown, and upon the teeth 154 rests a brick of hard cheese 157 held within a compartment 158 of said housing, whereby the rotation of the gear 153 causes its teeth 154 to grate the cheese 157 and sift such gratings downwardly through the openings 155.

The shaft 117 carries a helical gear 159 that meshes with a pair of gears 160, Figs. 1, 5, each of which is keyed on a rotatable shaft 161 carrying a pair of pulleys 162. Over shafts 161 are idler rotatable shafts 163 carrying cooperating pulleys 164, and over each set of the cooperating pulleys 162, 164 is drawn a wire screen belting 165, between which is frictionally held a block of soft cheese 166, as illustrated in Fig. 1, whereby the continually moving belts 165 impart yieldable downward movement to the cheese block 166. Underneath said cheese block is located a wheel 167, the spokes 168 of which constitute knife blades 169 joined to a hub 170 keyed upon shaft 117, whereby as the rotating blades 169 strike the downwardly moving cheese block 166 they continually slice off segments thereof, which slicings drop out downwardly.

In the housing 119 are built in tanks 171 containing tomato fluid 172, Fig. 3, which tanks are joined by a common conduit 173, Fig. 1, and one of said tanks is provided with an orifice 174 normally closed by a cap 175 having a lever-arm 176 fulcrumed at 177 to the housing 119. The cap 175 is normally held closed by a spring 178 secured to the housing, and a cam 179 forming part of the gear 159 strikes the terminal of arm 176 intermittently upwardly during its rotation contrary to the tension of said spring, in which manner the cap 175 acts as a valve that intermittently lets out quantities of the tomato fluid 172 as the seasoning mechanism is in operation. The housing 119 also carries a tank 180 of olive oil, Fig. 1, from which a tube 181 leads directly into the orifice 174, Fig. 3, whereby as the tomato fluid leaves said orifice it is admixed with the olive oil. The tanks 171, 180 are preferably surrounded by chambered jacketings 182 which contain cool water constantly circulated therethrough by pipe lines 183 joined thereto and leading to a service source.

When the intermittent revolutionary travel of the tray 45 brings its centre into registry with the radial line r of region b, Fig. 1, it comes to a resting period with its axis and that of its rotatable shaft directly in alignment with the operating shaft 117 of the seasoning device 115. As the tray approaches this position its flange 75 held in place by its strong spring 76 strikes the cam 149 and thereby shifts it toward the right, as viewed in the drawing, and its plate 146 then slides accordingly and actuates the lever 134 to slide the clutch member 126 upwardly. This clutches the members 126, 125 and the shafts 127, 122, and power is thereupon transmitted from pulley 54 by means of cam tooth 130 and gear 129, through said shafts, and gears 121, 120, to the operating shaft 117 of the seasoning device 115. The tray 45 being meanwhile in continued rotation, the shaft 117 operates the said device in the above described manner to perform all of its functions of depositing seasoning layers in uniformity, of cheeses 157, 166, tomato fluid 172, and olive oil from tank 180 admixed with said fluid, upon the face of the pizza dough 112a.

Simultaneously, the cam-plate 146 draws the link 144, which actuates the pawl 140, causing its toothed terminal 184 to enmesh with the worm 40, which causes said terminal to advance rightwardly, as viewed in the drawing, and swing said pawl about its pivot 141. Upon approach of the pawl terminal 184 to the end of its stroke the pawl lever 140 draws the link 136 and actuates the lever 134 to unclutch the members 126, 125, thereby cutting off the power from the seasoning mechanism 115 to discontinue its operation, and restoring the lever 134 and plate 146 with the parts depending therefrom to the inoperative positions illustrated in the drawings, the spring 151 restoring the pawl terminal 184 to its elevated state shown, as said terminal departs from the worm 40 at commencement of the revolutionary travel of the tray 45. This operation being completed and the pizza 46 having had the seasonings fully performed thereon it is carried further by the revolutionary travel of the tray 45 out of the region b and into the arcuate oven 47, Fig. 1, wherein it becomes fully baked, until it emerges from the opposite exit 185 into the region c.

In the region c and astride its centre line r is located a sector-shaped, shovel-like blade 186, Figs. 1, 4, which blade lies in the plane of the surface of the tray 45. Said blade is held by a hinge 187 in turn held by a plate 188 secured to a post 189 mounted on a bracket 190 projecting from the machine frame 2, and to said hinge is secured a lever 191 that projects downwardly as shown in Fig. 4. Near the lever 191 is situated a horizontal lever 192 pivoted at 193 to a post 194 mounted upon the bracket 190.

When the emerging tray 45 leaves the oven 47, Fig. 1, and arrives at its resting position in registry with the radial centre line r of region c, the blade 186 acting knife-like and shovel-like becomes interposed between the completely baked pizza 46 and the tray 45, as illustrated in Fig. 4. Upon commencement of the revolutionary movement of the tray 45, its shaft 43 strikes the lever 192 which in turn actuates the lever 191, causing the latter to tilt the blade 186 to the position shown by the dot and dash lines, Fig. 4, which blade thereby elevates the pizza and conveys it onto the sloping table 195 toward a lever table, not shown, ready for service and consumption. As the tray 45 leaves the region c, the blade 186 drops back by its gravity to normal position, which in turn restores its above actuating parts 191, 192 to normal position.

It will be evident that in the continuous operation of this machine, all that is required by its operative, who is situated by the handle 65 of lever 64, is the depositing of the dough batches 112 upon the advancing trays 45 as they arrive at his situation, and the coincident drawing downward of the lever 64 to initiate the preparation and centrifugal action of the dough to the pizza form 112a, this preparation as well as all the seasonings, baking, and discharging of the pizzas being performed entirely automatically.

Variations may be resorted to within the scope of the invention, and portions of the improvements may be used without others.

Having thus described my invention, I claim:

1. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, and means for operating said device as each of said trays is brought thereunder during one of its said resting periods.

2. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, means to unclutch each of said trays from its rotating means during one of its resting periods, and means to impart an increased rate of rotation to said unclutched tray for centrifugally forming pizza dough thereon.

3. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, and means to lift and remove the baked pizza from each of said trays during one of its resting periods.

4. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, means to unclutch each of said trays from its rotating means during one of its resting periods, means to impart an increased rate of rotation to said unclutched tray for centrifugally forming pizza dough thereon, and means to lift and remove the baked pizza from each of said trays during one of its resting periods.

5. A pizza making machine having the combination of an endless series of pizza retaining trays adapted to traverse in a horizontal plane, means to impart to said series of trays intermittent traversals with intervening resting periods, means to impart continuous rotation to each of said trays, and a baking oven enveloping a portion of said series of trays.

6. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, and said seasoning device including means for discharging seasoning fluids, means for grating cheese, and means for slicing cheese.

7. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, said seasoning device including means for discharging seasoning fluids, means for grating cheese, means for slicing cheese, and means for cooling said seasoning substances while retained in said device.

8. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, said seasoning device including tanks for seasoning fluids, and means for intermittently discharging the fluids from said tanks.

9. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, said seasoning device including tanks for seasoning fluids, means for intermittently discharging the fluids from said tanks, means for grating cheese, and means for slicing cheese.

10. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, a device for seasoning the pizzas located exteriorly of said oven, means for operating said device as each of said trays is brought thereunder during one of its said resting periods, said seasoning device including tanks for seasoning fluids, means for intermittently discharging fluids from said tanks, means for grating cheese, means for slicing cheese, and means for cooling said seasoning substances while retained in said device.

11. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, and means to lift and remove the baked pizza from each of said trays during one of its resting periods including a blade insertable between the baked pizza and its tray at the termination of one of its fractional revolutions.

12. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to lift and remove the baked pizza from each of said trays during one of its resting periods, including a blade insertable between the baked pizza and its tray at the termination of one of its fractional revolutions, and means to elevate said blade tiltingly after said insertion.

13. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, and means to centralize and control said centrifugal forming of the dough.

14. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, and means to expand said band during the centrifugal forming of the dough.

15. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, and means to descend said band upon said tray and elevate it from said tray.

16. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, manual means to descend said band upon said tray, means to lock said band in descended state, and means to automatically unlock said band and elevate it from said tray.

17. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, means to descend said band upon said tray, and means to impart rotation to said band while it is in descended state.

18. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, means to descend said band upon said tray, means to impart rotation to said band while it is in descended state, and means to expand said band during the centrifugal forming of the dough and the rotation of said band.

19. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, means to descend said band upon said tray, and means to impart rotation to said band from the rotation of said tray while the band is in descended state.

20. A pizza making machine having the combination of an endless series of pizza retaining trays adapted to traverse in a horizontal plane, means to impart to said series of trays intermittent traversals with intervening resting periods, means to impart continuous rotation to each of said trays, a baking oven enveloping a portion of said series of trays, means to unclutch each of said trays from its rotating means during one of its resting periods, means to impart an increased rate of rotation to said unclutched tray for centrifugally forming pizza dough thereon, means to centralize and control said centrifugal forming of the dough including an expansible and contractible band, means to maintain said band in contracted state, means to expand said band during the centrifugal forming of the dough, means to descend said band upon said tray, means to impart rotation to said band from the rotation of said tray while the band is in descended state, and means to expand said band during the centrifugal forming of the dough and the rotation of said band.

SALVATORE PACILIO.